US008188972B1

(12) United States Patent
Krenz et al.

(10) Patent No.: US 8,188,972 B1
(45) Date of Patent: May 29, 2012

(54) SYSTEM AND METHOD FOR PROVIDING A VISUAL INDICATOR WHICH INDICATES FUNCTIONS OF MULTI-PURPOSE CONTROLS IN A CURSOR-DRIVEN DISPLAY ENVIRONMENT

(75) Inventors: Michael J. Krenz, Cedar Rapids, IA (US); Pamela K. Hahn, Cedar Rapids, IA (US); Colin D. Reed, Cedar Rapids, IA (US); Bryan C. Schultz, Marion, IA (US); David L. Leedom, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1109 days.

(21) Appl. No.: 11/821,362

(22) Filed: Jun. 22, 2007

(51) Int. Cl.
*G09G 5/08* (2006.01)
*G06F 3/033* (2006.01)

(52) U.S. Cl. ........ 345/157; 345/156; 345/160; 345/161; 701/14

(58) Field of Classification Search .......... 345/156–161, 345/173, 184; 715/856–862
See application file for complete search history.

(56) References Cited

U.S. PATENT DOCUMENTS

| | | | | |
|---|---|---|---|---|
| 5,125,071 A | * | 6/1992 | Ozeki | 715/811 |
| 6,476,794 B1 | * | 11/2002 | Kataoka et al. | 345/161 |
| 6,784,869 B1 | * | 8/2004 | Clark et al. | 345/156 |

* cited by examiner

*Primary Examiner* — Kevin M Nguyen
*Assistant Examiner* — Kenneth B Lee, Jr.
(74) *Attorney, Agent, or Firm* — Donna P. Suchy; Daniel M. Barbieri

(57) ABSTRACT

The present invention is a method for providing a visual indicator which indicates functions of multi-purpose controls in a current cursor location context. The method includes providing a current cursor location context. The method further includes providing a visual indicator based on the current cursor location context. The visual indicator indicates a function of a multi-purpose control. The multi-purpose control is configured for allowing a user to interact with a cursor at the cursor's current location within the current cursor location context. Further, indicating the function of the multi-purpose control includes, prior to activation of the multi-purpose control, providing information regarding an interaction to take place with the cursor when the multi-purpose control is activated.

18 Claims, 4 Drawing Sheets

SYSTEM AND METHOD FOR PROVIDING A VISUAL INDICATOR WHICH INDICATES FUNCTIONS OF MULTI-PURPOSE CONTROLS IN A CURSOR-DRIVEN DISPLAY ENVIRONMENT

FIELD OF THE INVENTION

The present invention relates to the field of cursor-driven displays and particularly to a system and method for providing a visual indicator which indicates functions of multi-purpose controls in a current cursor location context.

BACKGROUND OF THE INVENTION

Multi-purpose controls are often implemented for making selections from and/or activating-deactivating program functions via a cursor-driven display. Techniques such as floating "tool tips", "comments" and/or "hover text" are currently implemented, for instance, in desktop software environments, for providing hints to a user regarding the function of a highlighted multi-purpose control. Such techniques are intended to promote efficient operation of/user interaction with the cursor-driven display by providing hints as to what a multi-purpose control will do when the control is utilized/activated, prior to the user actually utilizing/activating said control. However, in more complex, stressful environments, where faster decision-making/user interaction with the cursor-driven display may be of paramount importance, such currently-used techniques may not provide an interface as user-intuitive as may be necessary or desirable for the conditions. Consequently, this may promote confusion for users in that the users may not be as clear as they need to be (or may not be made aware as quickly as they need to be) as to what will happen when specific multi-purpose controls are utilized or activated. For example, a user of a flight deck (i.e., cockpit) system display, such as a pilot, may have difficulty quickly recognizing or recalling what functions will occur upon utilization or manipulation of one or more multi-purpose controls, especially when said pilot is under stress associated with abnormal flight conditions.

Thus, it would be desirable to provide a system and method for providing a visual indicator which indicates functions of multi-purpose controls in a current cursor location context, such as in a cursor-driven display environment, that addresses the problems associated with current solutions.

SUMMARY OF THE INVENTION

Accordingly, an embodiment of the present invention is directed to a method for providing a visual indicator which indicates functions of multi-purpose controls in a current cursor location context, the method including: providing a current cursor location context; and providing a visual indicator based on the current cursor location context, the visual indicator indicating a function of a multi-purpose control, the multi-purpose control configured for allowing a user to interact with a cursor at the cursor's current location within the current cursor location context, wherein indicating the function of the multi-purpose control includes, prior to activation of the multi-purpose control, providing information regarding an interaction to take place with the cursor when the multi-purpose control is activated.

A further embodiment of the present invention is directed to a computer-readable medium having computer-executable instructions for performing a method for providing a visual indicator which indicates functions of multi-purpose controls in a current cursor location context, said method including: providing a current cursor location context; and providing a visual indicator based on the current cursor location context, the visual indicator indicating a function of a multi-purpose control, the multi-purpose control configured for allowing a user to interact with a cursor at the cursor's current location within the current cursor location context, wherein indicating the function of the multi-purpose control includes, prior to activation of the multi-purpose control, providing information regarding an interaction to take place with the cursor when the multi-purpose control is activated.

An additional embodiment of the present invention is directed to a system for providing a visual indicator which indicates functions of multi-purpose controls in a current cursor location context, including: a memory; a processor, the processor configured for being communicatively coupled to the memory, the processor further configured for receiving an input via a control panel, the control panel configured for being communicatively coupled with the processor, the control panel including a multi-purpose control, the processor configured for outputting a current cursor location context and a visual indicator, the visual indicator being based on the current cursor location context, the visual indicator indicating a function of the multi-purpose control, the multi-purpose control configured for providing the input to the processor via the control panel, thereby allowing a user to interact with a cursor at the cursor's current location within the output current cursor location context; and a display, the display configured for being communicatively coupled with the processor, the display further configured for displaying the output current cursor location context and the output visual indicator, wherein indicating the function of the multi-purpose control includes, prior to activation of the multi-purpose control, providing information regarding an interaction to take place with the cursor when the multi-purpose control is activated.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
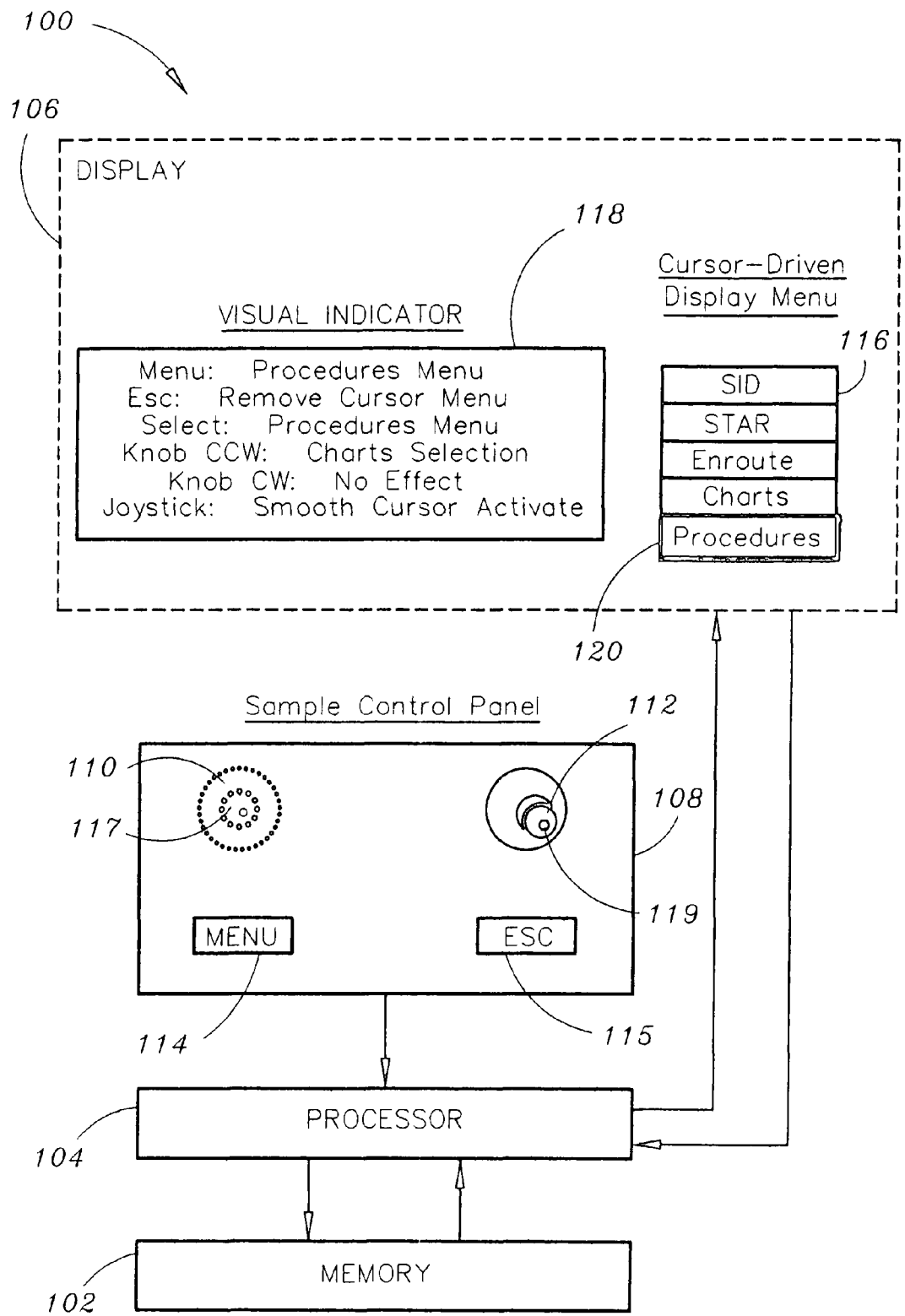
FIG. 1 is a block diagram illustrating a system for providing a visual indicator which indicates functions of multi-purpose controls in a current cursor location context in accordance with an exemplary embodiment of the present invention.

FIG. 1 is a block diagram schematic of a system for providing a visual indicator which indicates functions of multi-purpose controls in a current cursor location context, such as a cursor-driven display environment, in accordance with an exemplary embodiment of the present invention. In a current embodiment of the present invention, the system 100 includes a memory 102, a processor 104 and a display 106. In an exemplary embodiment, the processor 104 is configured for being communicatively coupled with the memory 102. The processor 104 is further configured for receiving an input via a control panel 108, the control panel 108 configured for being communicatively coupled with the processor 104. In exemplary embodiments, the control panel includes one or more multi-purpose controls which may be activated for providing the input to the processor 104. For example, the multi-purpose control(s) may be a knob 110, a joystick 112, a button (114, 115, 117, 119), trackball, touchpad, or the like which may be manipulated/activated, such as by a user, for providing the input to the processor 104 via the control panel 108.

In exemplary embodiments, the processor 104 is configured for outputting a current cursor location context. For example, the current cursor location context may be a cursor-driven display menu 116. In additional embodiments, the processor 104 is further configured for outputting a visual indicator 118. In further embodiments, the output cursor-driven display menu 116 and the output visual indicator 118 may be displayed by the display 106 (as shown in FIG. 1), the display being configured for being communicatively coupled with the processor 104. In a current embodiment of the present invention, the visual indicator 118 may be a display window (ex—a What Would This Do (WWTD) window) which contains a listing of the multi-purpose controls and their corresponding functions based upon the cursor-driven display menu 116. For example, the cursor-driven display menu 116 may list a number of menu selections which may be selected and provides a cursor 120, which may be positioned along the menu 116 for highlighting a menu selection via activation/utilization of the multi-purpose controls (110, 112, 114, 115, 117, 119 etc.) of the multi-purpose control panel 108.

In the illustrated embodiment (shown in FIG. 1), the system 100 of the present invention is implemented as part of a flight deck/cockpit control system. Accordingly, the cursor-driven display menu 116 may include menu selections such as SID (Standard Instrument Departure), STAR (Standard Terminal Arrival Route), Enroute, Charts and Procedures. For instance, when the cursor 120 is positioned to highlight SID and SID is selected via the multi-purpose control panel 108, a submenu, a window or the like providing information pertaining to departure procedures which define a pathway out of an airport and onto an airway structure may be provided/displayed. Further, when the cursor 120 is positioned to highlight STAR and STAR is selected via the multi-purpose control panel 108, a submenu, a window or the like providing information pertaining to arrival procedures which define a pathway into an airport from an airway structure may be provided/displayed. Further, when the cursor 120 is positioned to highlight Enroute and Enroute is selected via the multi-purpose control panel 108, a submenu, a window or the like providing information pertaining to procedures to follow (ex—holds, traffic instructions), and/or descriptions of flight progress during the enroute/cruise climb phase(s) of the flight, (ex—between SID/STAR) may be provided/displayed. Enroute forms or logs which may indicate and/or allow a user to enter the following: arrival time, departure time, flight time, etc. may also be provided/displayed when Enroute is selected. Further, when the cursor 120 is positioned to highlight Charts and Charts is selected via the multi-purpose control panel 108, a submenu, a window or the like providing information pertaining to various charts, such as route facility charts, sectional charts, VFR terminal area charts, world aeronautical charts, enroute low altitude charts, enroute high altitude charts, flight planning charts, fuel consumption charts, inspection checklists, or the like, may be provided/displayed when Charts is selected. Further, when the cursor 120 is positioned to highlight Procedures and Procedures is selected via the multi-purpose control panel 108, a submenu, a window or the like providing information pertaining to approach procedures for destination/alternate airports, normal procedures (ex—cockpit safety inspection procedures, initial cockpit preparation procedures), abnormal/emergency procedures (ex—gear failure procedures, engine failure procedures), or the like, may be provided/displayed when Procedures is selected.

In exemplary embodiments, the visual indicator 118 is based on the cursor-driven display menu 116. For example, in the illustrated embodiment, the visual indicator 118 indicates functions of the multi-purpose controls of the multi-purpose control panel 108. Said functions are based on menu selections provided by the cursor-driven display menu 116, thereby allowing the multi-purpose controls to be utilized for interacting with the cursor-driven display menu 116. In the illustrated embodiment, the visual indicator 118 (as shown in FIG. 1) may list/provide information (prior to activation of a multi-purpose control) which details interactions that will take place with the cursor-driven display menu if specific multi-purpose controls are utilized/activated (ex—a user input via manipulation/utilization of the control(s) is received by the processor 104). For instance, since the embodiment of the system 100 of the present invention shown in FIG. 1 is implemented as part of a flight deck control system, the visual indicator 118 may list functions of the multi-purpose controls which indicate what interaction will take place with the cursor-driven display menu 116 (within the context of the cursor-driven display menu shown 116 shown in FIG. 1, which shows the menu selections SID, STAR, Enroute, Charts and Procedures and indicates that the cursor is positioned so that it is currently highlighting the Procedures menu selection) when said multi-purpose controls are activated. In the illustrated embodiment, the visual indicator 118 indicates/provides information that activation/utilization of the Menu button 114, will cause the Procedures Menu/Submenu to be provided, since Procedures is currently highlighted by the cursor 120 and the Procedures selection is a sub-menu of the cursor-driven display menu 116.

Further, the visual indicator 118 may indicate/provide information that activation/utilization of the ESC (ex—Escape) button 115 will cause the cursor-driven display menu 116 to be removed or closed. Further, the visual indicator 118 may indicate/provide information that activation/utilization of the Select buttons (117, 119) will cause the Procedures Menu/Submenu to be provided, since the Procedures selection is currently highlighted by the cursor. Further, the visual indicator 118 may indicate/provide information that activation/utilization (ex—turning) of the Cursor knob 110 in a counter-clockwise (CCW) direction will re-position the cursor 120 so that it highlights the Charts selection of the cursor-driven display menu 116. Conversely, the visual indicator 118 may indicate/provide information that activation/utilization (ex—turning) of the Cursor knob 110 in a clockwise (CW) direction will have no effect (ex—cursor will remain positioned to highlight the Procedures selection), since the cursor is already positioned to highlight the bottom-most positioned selection on the cursor-driven display menu 116. Further, the visual indicator 118 may indicate/provide information that activation/utilization of the joystick 112 will enable a smooth cursor activate function, which may allow the cursor 120 be multi-directionally re-positionable along the menu and/or the display 106 at varying rates of speed (ex—slow/precise crawl, display/screen crossing zip, etc.) for promoting more precise control of the cursor 120. In further embodiments, other controls, such as a trackball, touchpad, or the like, may be implemented as multi-purpose controls, for performing various functions, such as the smooth cursor activate function. Such information may promote ease of use of the system 100 and may promote alleviation of confusion concerning the corresponding functions of the multi-purpose controls, particularly in high stress environments, by stating in detail what exactly will happen when specific multi-purpose controls are activated/utilized. As discussed above, the system 100 of the present invention allows for function information to be provided via the visual indicator 116 (ex—the WWTD display window) in a context-sensitive, detailed manner.

Figure 2:
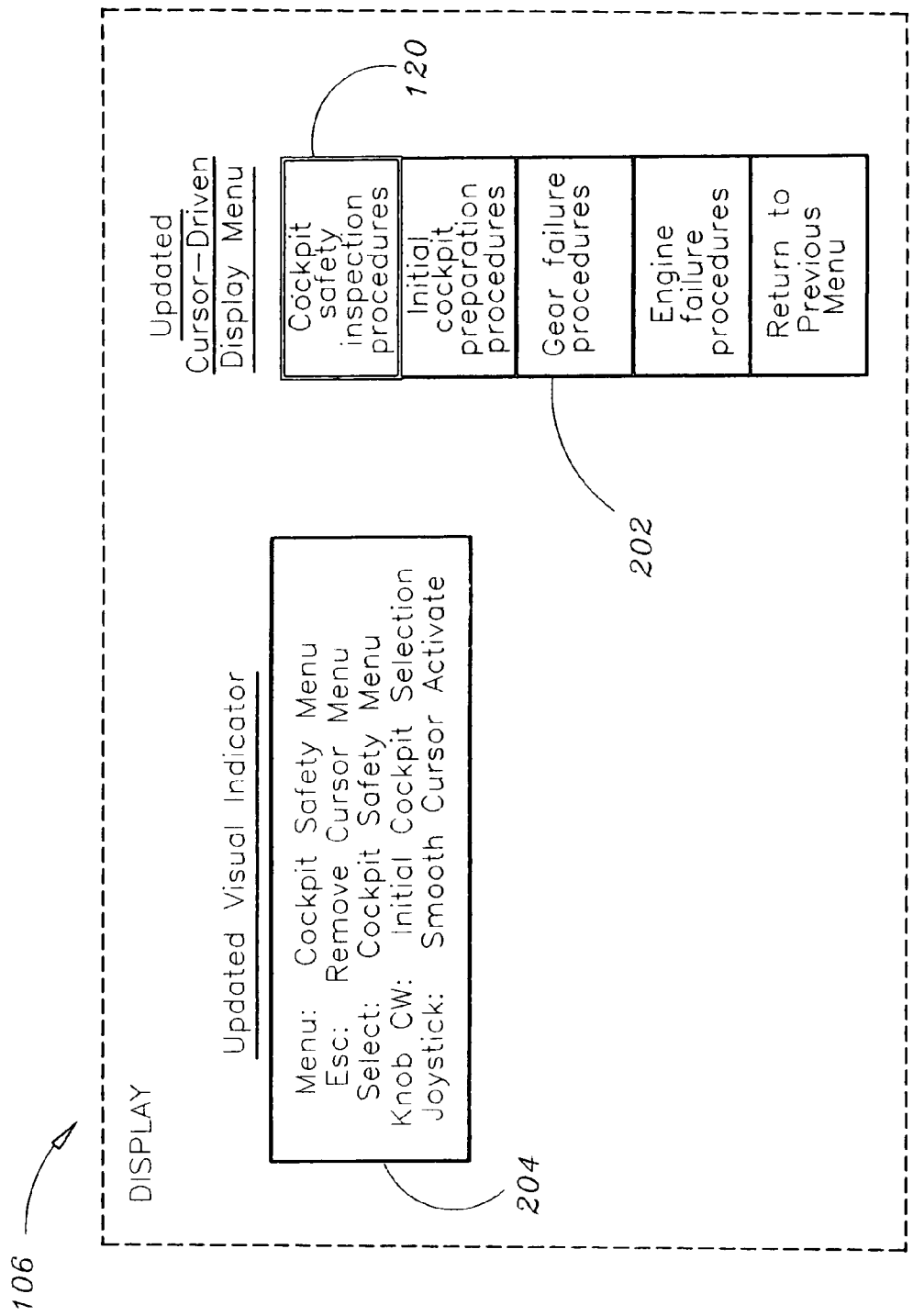
FIG. 2 is a screenshot of a display of the system of the present invention which is displaying an updated visual indicator and an updated cursor-driven display menu in accordance with an exemplary embodiment of the present invention.

In an exemplary embodiment, once an input is received by the processor 104 via utilization/activation of the one of the multi-purpose controls (110, 112, 114, 115, 117, 119), the cursor-driven display menu is updated based upon the received input and also in accordance with the detailed interaction information provided by the visual indicator 116. For example, as discussed above in reference to the illustrated embodiment (FIG. 1), an input may be provided by activation of a control, such as the menu button 114, which may cause the cursor-driven display menu 118 to be updated (as shown in FIG. 2). For instance, a user may activate the MENU button, which, in accordance with information provided by the visual indicator 116, may cause the cursor-driven display menu 118 to be updated so that an updated cursor-driven display menu 202 (ex—which includes the Procedures menu/submenu) is provided and displayed via the display 106 (as shown in FIG. 2). For example, the Procedures menu may list a plurality of submenu selections (exs—cockpit safety inspection procedures, initial cockpit preparation procedures, gear failure procedures, engine failure procedures, etc.) which may be selected for allowing a user to locate more specific information. A further menu selection may be included "Return to Previous Menu" or "Return to Main Menu" which allows a user to navigate back to a previously displayed cursor-driven display menu. Additionally, the system 100 may be further configured for updating the visual indicator based on the updated cursor-driven display menu 202. For instance, an updated visual indicator 204 may be provided by the system 100 and displayed via the display 106. (as shown in FIG. 2). Further, the updated visual indicator 204 may provide updated functions of the multi-purpose controls which correspond to the updated cursor display menu 202 by providing an indication of what interaction with the updated cursor-driven display menu may take place if specific multi-purpose controls are manipulated/activated/utilized. For example, the updated visual indicator 204 may provide information which indicates that activation of one of the select buttons 117, 119) may cause the cursor-highlighted selection "cockpit safety inspection procedures" to be selected, which may cause the cursor-driven display menu to provide more precise information specific to/corresponding to the selection of "cockpit safety inspection procedures" (ex—may cause the updated cursor-driven menu (and the updated visual indicator) to be updated once again).

In further embodiments, the current cursor location context 116 may be provided in various manners other than as a cursor-driven display menu. For example, the current cursor location context 116 may be provided as a displayed list, such as a list of flight approaches which a user may click through/select from, or the like. In still further embodiments, the visual indicator 118 may be displayed without a cursor-driven display menu 116. For instance, when no menu 116 is displayed, the visual indicator may list control functions such that the CW knob and/or the CCW knob would have listed function(s) indicating that manipulation of said knob(s) may allow a user to direct a cursor through home position(s) of each window displayed via the display 106

Figure 3:
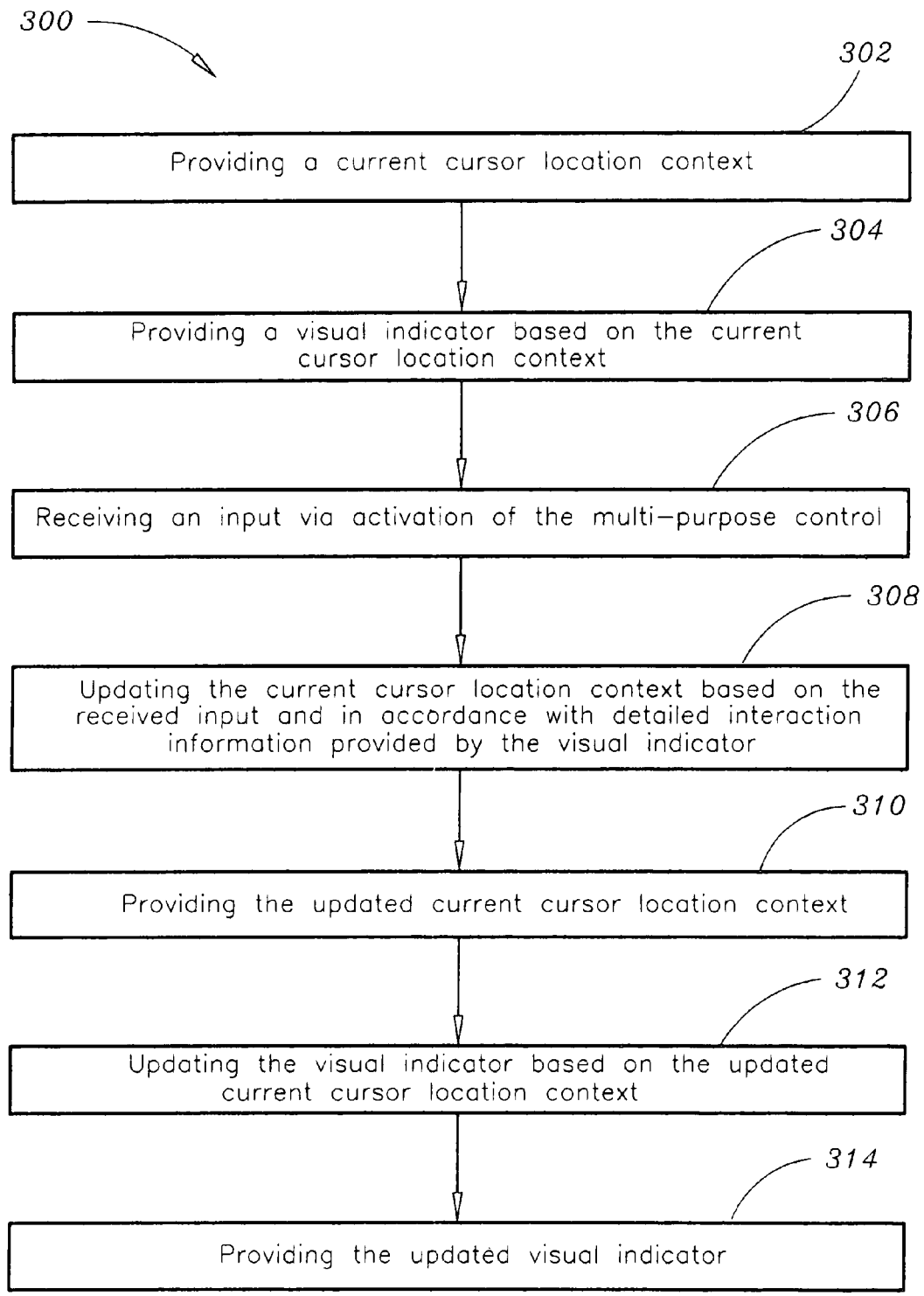
FIG. 3 is a flowchart illustrating a method for providing a visual indicator which indicates functions of multi-purpose controls in a cursor-driven display environment in accordance with an exemplary embodiment of the present invention.

FIG. 3 illustrates a method for providing a visual indicator which indicates functions of multi-purpose controls in a cursor-driven display environment. In a present embodiment, the method 300 may include providing a current cursor location context 302. In further embodiments, the method 300 may further include providing a visual indicator based on the current cursor location context 304. In an exemplary embodiment, the visual indicator indicates a function of a multi-purpose control. Further, the multi-purpose control may be configured for allowing a user to interact with a cursor at the cursor's current location with the current cursor location context. In current embodiments of the present invention, indicating the function of the multi-purpose control includes, prior to activation of the multi-purpose control, providing information regarding and/or detailing an interaction to take place with the cursor when the multi-purpose control is activated.

In exemplary embodiments, the method 300 may further include receiving an input via activation of the multi-purpose control 306. In additional embodiments, the method 300 may further include updating the cursor-driven display menu based on the received input and in accordance with the detailed interaction information provided by the visual indicator 308.

In present embodiments, the method 300 may further include providing the updated cursor-driven display menu 310. In further embodiments, the method 300 may further include updating the visual indicator based on the updated cursor-driven display menu 312. In an exemplary embodiment, the method 300 may further include providing the updated visual indicator 314. In current embodiments of the present invention, the updated visual indicator includes an updated function of the multi-purpose control. The updated function may provide information regarding/detailing an interaction to take place with the updated visual indicator when the multi-purpose control is activated.

Figure 4:
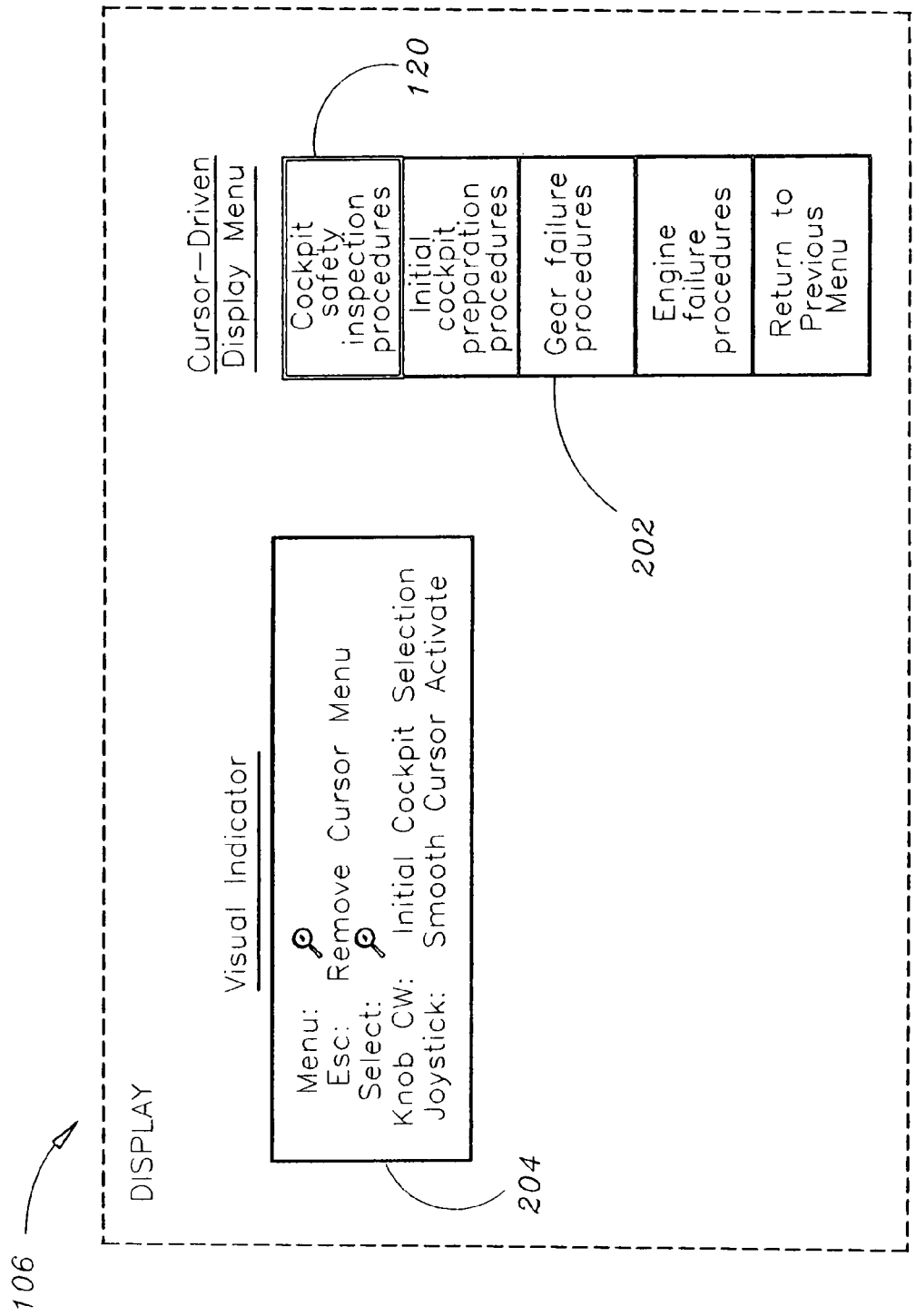
FIG. 4 is a screenshot of a display of the system of the present invention which is displaying a visual indicator which indicates functions of multi-purpose controls via graphical identifications.

In exemplary embodiments, the visual indicator and/or the updated visual indicator may indicate the function of the multi-purpose control by including a textual identification of the function of the multi-purpose control. In alternative embodiments, the visual indicator and/or the updated visual indicator may indicate the function of the multi-purpose control by including a graphical identification of the function of the multi-purpose control. For example, in FIG. 4, since the cursor 120 is highlighting the "Cockpit Safety Inspection Procedures" selection from the cursor-driven display menu, the visual indicator 204 provides a graphical indication, such as via a magnifying glass icon, to indicate that the function of multi-purpose controls (ex—Menu button, Select Button) may cause information pertaining to Inspection Procedures (ex—Cockpit Safety Inspection Procedures) to be displayed. In further embodiments, the visual indicator and/or the updated visual indicator may indicate the function of the multi-purpose control by including both a textual identification of the function of the multi-purpose control and a graphical identification of the function of the multi-purpose control. In additional embodiments of the system 100 of the present invention, a textual identification of the multi-purpose control and/or a graphical identification of the multi-purpose control may also be displayed/implemented for identifying the multi-purpose control via the visual indicator. In still further embodiments, the visual indicator and/or the updated visual indicator may be provided via a display window.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method, comprising:
    providing a cursor-driven display menu, the cursor-driven display menu providing a listing of a plurality of menu options; and
    providing a display window, the display window including the cursor-driven display menu, a listing of a plurality of multi-purpose controls, and a listing of a plurality of corresponding context-sensitive functions of the plurality of multi-purpose controls, said listing of corresponding context-sensitive functions of the multi-purpose controls being based upon a current location of a cursor within the cursor-driven display menu and upon a context of the menu option associated with the current location of the cursor, said cursor at the current location highlighting the menu option associated with the current location of the cursor, the display window contemporaneously displaying the listing of the plurality of multi-purpose controls, the listing of corresponding context-sensitive functions of the multi-purpose controls, and the cursor-driven display menu, wherein the plurality of multi-purpose controls are configured for allowing a user, through activation of one of the plurality of multi-purpose controls via a control panel, to execute one of the corresponding context-sensitive functions,
    wherein said listing of corresponding context-sensitive functions of the multi-purpose controls includes a first context-sensitive function corresponding to a first multi-purpose control included in the listing of multi-purpose controls, said listing of corresponding context-sensitive functions further including a second context-sensitive function corresponding to a second multi-purpose control included in the listing of multi-purpose controls, the first context-sensitive function providing information regarding a first interaction event to occur based upon the cursor's current location, upon the context of the menu option associated with the current location of the cursor, and contingent upon activation of the first multi-purpose control, the second context-sensitive function providing information regarding a second interaction event to occur based upon the cursor's current location, upon the context of the menu option associated with the current location of the cursor, and contingent upon activation of the second multi-purpose control.

2. A method as claimed in claim 1, further comprising:
    receiving an activation input for activating a multi-purpose control included in the plurality of multi-purpose controls.

3. A method as claimed in claim 2, further comprising:
    updating the cursor-driven display menu based on the received input.

4. A method as claimed in claim 3, further comprising:
    providing the updated cursor-driven display menu.

5. A method as claimed in claim 3, further comprising:
    updating the display window based on the updated cursor-driven display menu.

6. A method as claimed in claim 5, further comprising:
    providing the updated display window, the updated display window providing an updated listing of the plurality of multi-purpose controls and an updated listing of corresponding context-sensitive functions of the plurality of multi-purpose controls, the multi-purpose controls configured for allowing the user to interact with cursor at the cursor's current location within the updated cursor-driven display menu, wherein the updated listing of corresponding context-sensitive functions of the multi-purpose controls includes information regarding interactions to take place when the multi-purpose controls are at least one of: activated and re-activated.

7. A method as claimed in claim 6, wherein at least one of the display window and the updated display window provides the updated listing of corresponding context-sensitive functions of the multi-purpose controls by including at least one of a textual identification of the functions of the multi-purpose controls and a graphical identification of the functions of the multi-purpose controls.

8. A computer-readable medium having non-transitory computer readable code embodied therein, the non-transitory computer readable code comprising computer-executable instructions for performing a method, said method comprising:

providing a cursor-driven display menu, the cursor-driven display menu providing a listing of a plurality of menu options; and providing a display window, the display window including the cursor-driven display menu, a listing of a plurality of multi-purpose controls, and a listing of a plurality of corresponding context-sensitive functions of the plurality of multi-purpose controls, said listing of corresponding context-sensitive functions of the multi-purpose controls being based upon a current location of a cursor within the cursor-driven display menu and upon a context of the menu option associated with the current location of the cursor, said cursor at the current location highlighting the menu option associated with the current location of the cursor, the display window contemporaneously displaying the listing of the plurality of multi-purpose controls, the listing of corresponding context-sensitive functions of the multi-purpose controls, and the cursor-driven display menu, wherein the plurality of multi-purpose controls are configured for allowing a user, through activation of one of the plurality of multi-purpose controls via a control panel, to execute one of the corresponding context-sensitive functions, wherein said listing of corresponding context-sensitive functions of the multi-purpose controls includes a first context-sensitive function corresponding to a first multi-purpose control included in the listing of multi-purpose controls, said listing of corresponding context-sensitive functions further including a second context-sensitive function corresponding to a second multi-purpose control included in the listing of multi-purpose controls, the first context-sensitive function providing information regarding a first interaction event to occur based upon the cursor's current location, upon the context of the menu option associated with the current location of the cursor, and contingent upon activation of the first multi-purpose control, the second context-sensitive function providing information regarding a second interaction event to occur based upon the cursor's current location, upon the context of the menu option associated with the current location of the cursor, and contingent upon activation of the second multi-purpose control.

9. A computer-readable medium having non-transitory computer readable code embodied therein, the non-transitory computer readable code comprising computer-executable instructions for performing a method as claimed in claim 8, said method further comprising:

receiving an activation input for activating a multi-purpose control included in the plurality of multi-purpose controls.

10. A computer-readable medium having non-transitory computer readable code embodied therein, the non-transitory computer readable code comprising computer-executable instructions for performing a method as claimed in claim 9, said method further comprising:

updating the cursor-driven display menu based on the received input.

11. A computer-readable medium having non-transitory computer readable code embodied therein, the non-transitory computer readable code comprising computer-executable instructions for performing a method as claimed in claim 10, said method further comprising:

providing the updated cursor-driven display menu.

12. A computer-readable medium having non-transitory computer readable code embodied therein, the non-transitory computer readable code comprising computer-executable instructions for performing a method as claimed in claim 10, said method further comprising:

updating the display window based on the updated cursor-driven display menu; and providing the updated display window, the updated display window providing an updated listing of the plurality of multi-purpose controls and an updated listing of corresponding context-sensitive functions of the plurality of multi-purpose controls, the multi-purpose controls configured for allowing a user to execute one of the corresponding context-sensitive functions, wherein the updated listing of corresponding context-sensitive functions of the multi-purpose control includes, information regarding interactions to take place when the multi-purpose controls are at least one of: activated and re-activated.

13. A computer-readable medium having non-transitory computer readable code embodied therein, the non-transitory computer readable code comprising computer-executable instructions for performing a method as claimed in claim 12, wherein wherein at least one of the display window and the updated display window provides the updated listing of corresponding context-sensitive functions of the multi-purpose controls by including at least one of a textual identification of the context-sensitive functions of the multi-purpose controls and a graphical identification of the context-sensitive functions of the multi-purpose controls.

14. A system, comprising:

a memory;

a processor, the processor configured for being communicatively coupled to the memory, the processor further configured for receiving inputs via a control panel, the control panel configured for being communicatively coupled with the processor, the control panel including a plurality of multi-purpose controls, the processor configured for outputting a cursor-driven display menu, the cursor-driven display menu providing a listing of a plurality of menu options, the processor further configured for outputting a display window, the display window including the cursor-driven display menu, a listing of a plurality of multi-purpose controls, and a listing of a plurality of corresponding context-sensitive functions of the plurality of multi-purpose controls, said listing of corresponding context-sensitive functions of the multi-purpose controls being based upon a current location of a cursor within the cursor-driven display menu and upon a context of the menu option associated with the current location of the cursor, said cursor at the current location highlighting the menu option associated with the current location of the cursor, the multi-purpose control configured for providing the inputs to the processor via the control panel, thereby allowing a user to execute one of the corresponding context-sensitive functions; and a display, the display configured for being communicatively coupled with the processor, the display further configured for contemporaneously displaying the listing of the plurality of multi-purpose controls, the listing of corresponding context-sensitive functions of the multi-purpose controls, and the cursor-driven display menu, wherein said listing of corresponding context-sensitive functions of the multi-purpose controls includes a first context-sensitive function corresponding to a first multi-purpose control included in the listing of multi-purpose controls, said listing of corresponding context-sensitive functions further including a second context-sensitive function corresponding to a second multi-purpose control included in the listing of multi-purpose controls, the first context-sensitive function providing information regarding a first interaction event to occur based upon the cursor's current location, upon a context of the menu option associated with the current location of the cursor, and contingent upon activation of the first multi-purpose control, the second context-sensitive function providing information regarding a second interaction event to occur based upon the cursor's current location, upon a context of the menu option associated with the current location of the cursor, and contingent upon activation of the second multi-purpose control.

15. The system as claimed in claim 14, wherein the system is included as part of a flight deck system.

16. The system as claimed in claim 14, wherein the multi-purpose control is at least one of a knob, a joystick, a button, a trackball and a touchpad.

17. A system as claimed in claim 14, wherein the system is configured for updating the cursor-driven display menu based on the received inputs and in accordance with the activation of at least one of the first multi-purpose control and the second multi-purpose control.

18. A system as claimed in claim 14, wherein the system is further configured for updating the display window based on the updated cursor-driven display menu the system being further configured for displaying the updated display window, the updated display window including a listing of updated context-sensitive functions of the multi-purpose controls, the listing of updated context-sensitive functions including information regarding interactions to take place with the cursor within the updated cursor-driven display menu when the multi-purpose controls are re-activated.

* * * * *